United States Patent

[11] 3,617,959

[72] Inventor Richard Brander
Cicero, Ill.
[21] Appl. No. 40,956
[22] Filed May 27, 1970
[45] Patented Nov. 2, 1971
[73] Assignee Beltone Electronics Corp.

[54] VARIABLE ATTENUATOR WHEREIN INPUT SIGNAL IS SWITCHED IN RESPONSE TO MOVEMENT OF VARIABLE TAP
9 Claims, 6 Drawing Figs.

[52] U.S. Cl. .......... 333/81 R, 323/79, 323/80, 323/94
[51] Int. Cl. .......... H03h 7/26
[50] Field of Search .......... 333/81 R; 323/64, 74, 79, 80

[56] References Cited
UNITED STATES PATENTS
1,613,422 1/1927 Wegel .......... 333/81 X

*Primary Examiner*—Herman Karl Saalbach
*Assistant Examiner*—Paul L. Gensler
*Attorney*—Molinare, Allegretti, Newitt & Witcoff ABSTRACT: A ladder network having cascaded symmetrical resistor sections with a continuously variable output tap. A switch is provided at the input of the network to switch the input tap as a function of the attenuator setting to extend the attenuation range of a continuously variable attenuator. A bypass network functions to maintain the voltage at the output of the attenuator at a constant level when the input tap is switched.

INVENTOR.
RICHARD BRANDER
BY Molinare, Allegretti, Newitt, & Witcoff
ATTORNEYS

INVENTOR.
RICHARD BRANDER
BY Molinare, Allegretti, Newitt, & Witcoff
ATTORNEYS

VARIABLE ATTENUATOR WHEREIN INPUT SIGNAL IS SWITCHED IN RESPONSE TO MOVEMENT OF VARIABLE TAP

BACKGROUND OF THE INVENTION

Continuously variable attenuators are of great value in circuits where it is desired to produce an output signal having an amplitude equal to an adjustable fraction of the amplitude of the input signal. A continuously variable signal attenuator may be used for example to vary the output level of a signal generator.

In a continuously variable signal attenuator, it is often desirable to provide a large attenuation range. One problem with such attenuator networks is that when the attenuator operates at high attenuation settings, the current flowing into the attenuator produces undesired signals at the output due to mutual inductive coupling and common signal return paths.

Accordingly, it is desirable to provide a continuously variable signal attenuator which will minimize the undesired coupling between the input signal and the output signal when the attenuator is used at high-attenuation settings.

It is also desirable to provide such a signal attenuator which will prevent the generation of spurious transient signals in the output signal.

SUMMARY OF THE INVENTION

In a principal aspect, the present invention relates to a improvement in a continuously variable signal attenuator of the type having an output port, input port, a plurality of resistor sections connected in cascade to the input port and a variable tap connecting the output port to the resistor sections.

In a preferred embodiment, the improvement comprises a means for applying an input voltage to either the input port or to a bypass resistor connected to one of the cascaded sections and means responsive to the variable tap for switching the voltage applying means between the input port and the bypass resistor as the variable tap passes a predetermined point along the cascaded resistor sections.

In alternative preferred embodiments, the improvement comprises a single-pole single-throw switch for switching the input tap of the input voltage source through a bypass circuit into a branch of the signal attenuator network without generating spurious transients in the output signal when the variable tap passes a predetermined point along the cascaded sections.

DETAILED DESCRIPTION OF THE PREFERRED EMBODIMENTS

Figure 1:
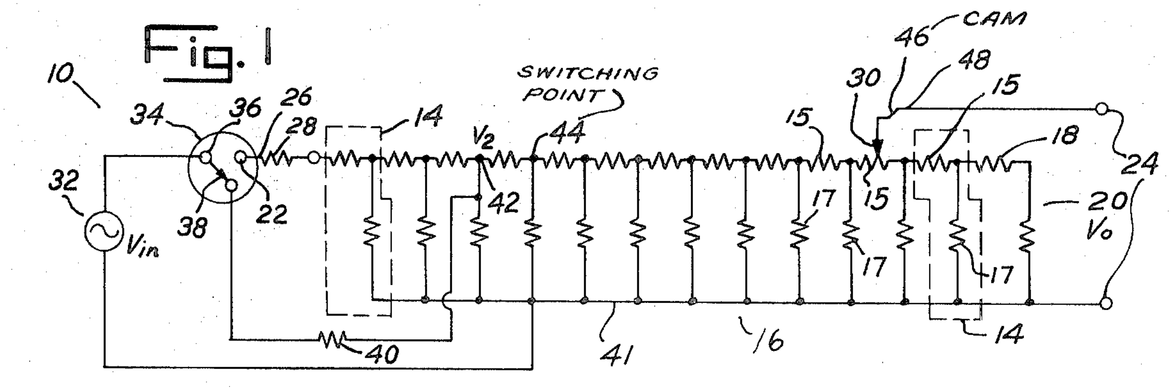
FIG. 1 is a schematic diagram of the improved signal attenuator network of this invention employing a single pole double-throw switch and bypass resistor.

One preferred embodiment of the improved variable signal attenuator network 10 is shown in FIG. 1. The attenuator 10 includes 12 symmetrical resistor sections 14 connected in cascade to form the ladder network 16. Each of the sections 14 includes a pair of series connected resistors 15 and 17 having values $R_1$ and $R_2$ respectively. The ladder network 16 is terminated by series connected resistors 18 and 20 having the values $R_1$ and $R_3$ respectively.

An input port 22 and an output port 24 are provided at the ends of network 16. The upper terminal 26 of the input port 22 is connected through resistor 28, having the value of $R_4$, to the initial cascaded section 14 of the ladder network 16. The output port 24 is connected to a variable output tap 30. The position of the output tap 30 may be varied along any of the resistors 15 of the cascaded sections 14.

An AC voltage source 32 is provided for delivering an input signal to the attenuator 10. A single-pole double-throw switch 34 is connected through its fixed contact 36 to the source 32. The movable contact or tap 38 of the switch 34 is displaceable into connection with the upper terminal 26 of the input port 22. Tap 38 is also displaceable into contact with a bypass resistor 40, having a value of $R_5$. The resistor 40 is connected at node 42 in series with one of the resistors 17.

As will be described more fully, the resistor 18 and resistor 20 constitute the characteristic impedance of the network 10. For this reason, the voltage and current attenuation will be equal. The operation of the continuously variable signal attenuator 10 is as follows.

As the variable output tap 30 is moved toward the left, the output voltage $V_0$ at the output port 24 is increased and the overall attenuation of the network 10 is decreased. Conversely, as the output tap 30 is moved toward the right along the network 10, the output voltage $V_0$ at output port 24 is decreased and the overall attenuation of the network 10 is increased. Because the components of the network 10 are not ideal, there is a certain amount of mutual inductance between the input end of the attenuator and various points along the ladder network 16. Because of this inductive coupling, the input current to the attenuator produces undesired frequency dependent voltages at various points along the ladder network 16. Also, a certain amount of resistance and inductance is present in the conductor 41 connecting the low end of the input port to the low end of the output port and the attenuator input current produces additional undesired voltage differences along this conductor. As the output tap 30 is moved toward the right as viewed in FIG. 1, the output voltage $V_0$ decreases and the undesired voltages contribute an increasing percentage of the output voltage. Thus, the error in the level of the output voltage increases.

The improved variable signal attenuator network of this invention reduces the undesired voltages by reducing the current flowing into the attenuator at high attenuation settings. This is done by switching the input tap 38 from the upper terminal 26 of the input port 22 to the bypass resistor 40. The switching occurs when the variable output tap 30 passes a predetermined point 44 along the resistors 15 of the cascaded sections 14.

The switching of the single-pole double-throw switch 34 may be accomplished by means of a cam 46 connected to the arm 48 of the tap 30. The cam 46 can be adjusted so that switching occurs when the variable output tap is at the predetermined point 44. When the arm 48 of the tap 30 is moved toward the left and passes the switching point 44, the cam 46 causes the movable contact 38 of the switch 34 to move from its normally biased position in contact with resistor 40, into contact with the terminal 26 of the input port 22. When the tap 30 is withdrawn to the right of switching point 44, the cam allows the movable contact 38 of the switch 34 to return to its normally biased position in contact with resistor 40.

It is desirable in switching the input tap or movable contact 38 of the switch 34 to produce no change in the output voltage $V_o$ at the output port 24 when the switching occurs. Thus, the resistor 40 must have a value such that the voltage $V_2$ at node 42 is the same with the tap 38 in contact with terminal 26 as it is with the tap 38 in contact with resistor 40. It has been found that the following values for the components of the network 10 will provide a serviceable system for the purposes of this invention.

Resistors 15 ($R_1$) =14.8 ohms
Resistors 17 ($R_2$) =10 ohms
Resistor 20 ($R_3$) =6.84 ohms
Resistor 28 ($R_4$) =6.84 ohms
Resistor 40 ($R_5$) =211 ohms
Attenuation tap spacing=10*d*B.

Figure 5:
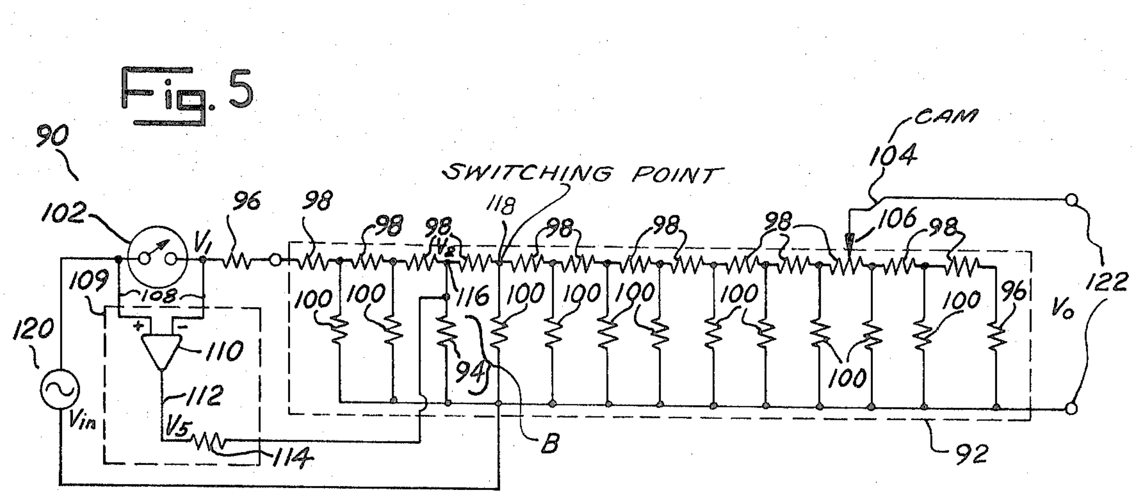
FIG. 5 is a schematic diagram of another preferred embodiment of this invention employing a single-pole single-throw switch and an amplifier bypass circuit.
Figure 6:
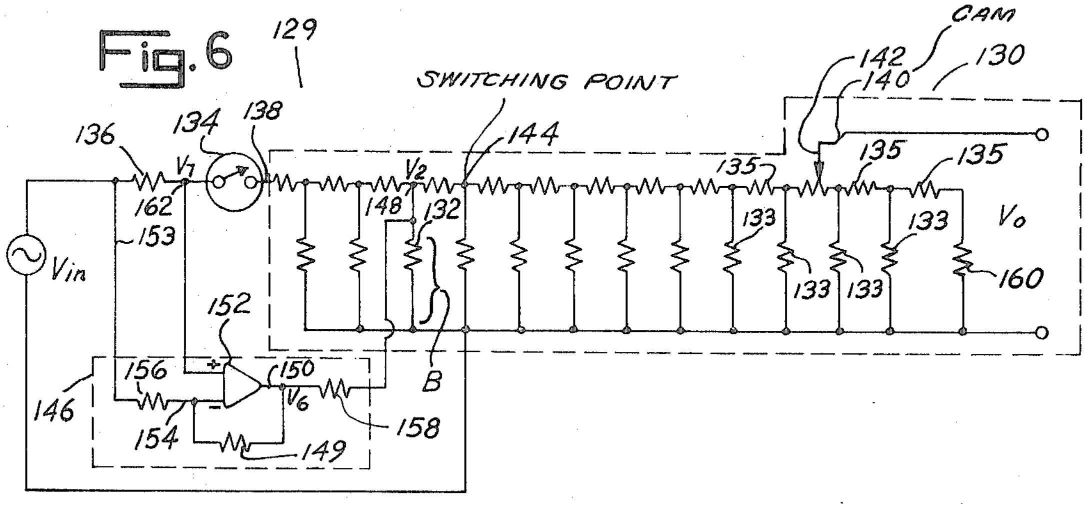
FIG. 6 is a schematic diagram of a further preferred embodiment of the present invention employing a single-pole single-throw switch and a second amplifier bypass circuit.

In the operation of the network 10, a finite time is required to switch the input tap 38 of the switch 34 from the terminal 26 to the resistor 40. During this time, the input tap is connected to neither point and a spurious electrical transient signal is generated. The circuits of FIGS. 2, 5 and 6 are designed to eliminate the generation of this spurious electrical transient while extending the effective range of the attenuator network.

Figure 2:
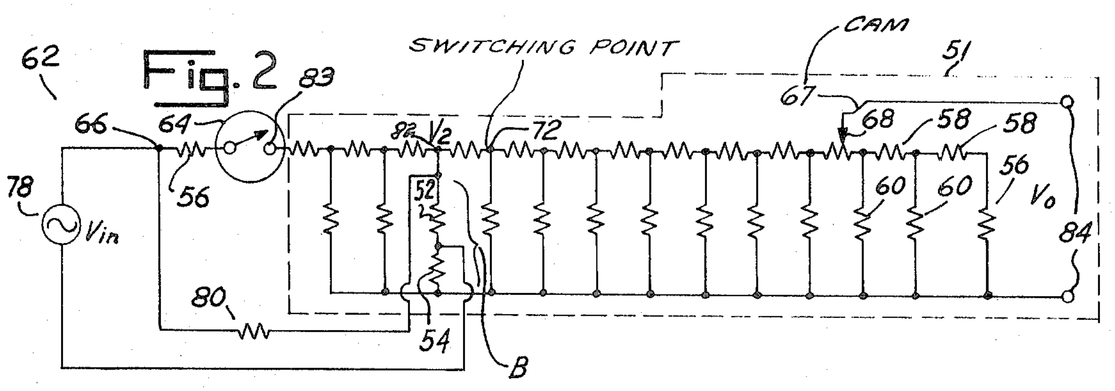
FIG. 2 is a schematic diagram of the improved variable signal attenuator of this invention employing a single-pole single-throw switch, a bypass resistor and a pair of branch resistors.

The ladder network 51 of the circuit shown in FIG. 2 is identical to the ladder network 16 of the attenuator 10 in FIG. 1 with one exception. The resistor 17 at node 42 in FIG. 1 is replaced by resistor 52 having a value $R_7$ and resistor 54 having a value $R_8$ in branch B of FIG. 2. The resistors 56 are identical to the resistor 20 in FIG. 1. Likewise, the resistors 58 along the upper portion of the ladder network 51 are identical to the resistors 15 of FIG. 1. Also, the resistors 60 of the ladder network 50 are identical to the resistors 17 of FIG. 1.

Basically, the attenuator 62 shown in FIG. 2 differs from the attenuator 10 shown in FIG. 1 in that a single-pole single-throw switch 64 is provided for switching the attenuator input tap 66. The switch 64 is operated in the same fashion as the switch 34 of FIG. 1, by a cam 67 when the output tap 68 passes the switching point 72.

When the switch 64 is open, the input voltage from source 78 is fed through resistor 80 having a value of $R_6$. Resistors 80, 52 and 54 are selected to provide a voltage $V_2$ at node 82 atop branch B of the ladder network 51. Voltage $V_2$ is the value of the voltage at node 82 when the switch 64 is closed. Thus, no overall voltage change in the output voltage $V_0$ at the output port 84 occurs when switch 64 is operated. Because the switch 64 is single-pole, single-throw, there is no transfer time involved and the action is instantaneous, preventing the generation of a spurious transient signal.

When the switch 64 is closed, the voltage source 78 is connected through resistor 56 to input port 83 of network 51. Also, the signal fed through resistor 80 is cancelled by an equal and opposite voltage developed across the resistor 54 by the input current to the attenuator network 62. Thus, when the switch 64 is closed, branch B performs like a single passive resistor. The values of the basic components for the particular embodiment of the circuit shown in FIG. 2 are as follows.

Resistors 56=6.84 ohms
Resistors 58=14.8 ohms
Resistors 60=10 ohms

Figure 3:
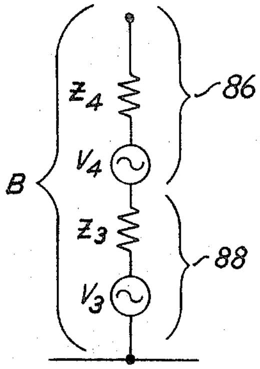
FIG. 3 is the Thevenin equivalent circuit of the pair of branch resistors of FIG. 2.

To more fully describe the circuit shown in FIG. 2, branch B of the network 62 has been replaced by two Thevenin equivalent networks 86 and 88 connected in series as shown in FIG. 3. When the switch 64 is closed, $V_3$, the Thevenin voltage source of the Thevenin equivalent network 88 is approximately equal to $$-V_{in}\left(\frac{R_8}{R_8+Z_1+6.84}\right)$$

where $Z_1$ is the characteristic impedance of ladder network 50. Also, $Z_3$, the Thevenin impedance of the Thevenin equivalent network 88 is approximately equal to $R_8$. The Thevenin equivalent voltage source $V_4$ of the Thevenin equivalent network 86 equals $$V_{in}\left(\frac{R_7}{R_6+R_7}\right).$$

In this network 86, $$Z_4=\frac{R_6R_7}{R_6+R_7}.$$

Figure 4:
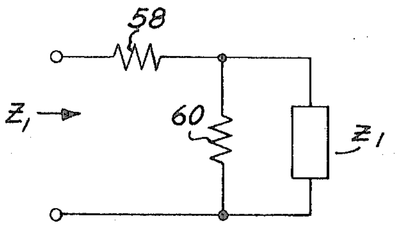
FIG. 4 is a schematic diagram of a single symmetric resistor section of the network of FIG. 2 terminated by the characteristic impedance of the section.

In order that the branch B act as a single passive resistor when the switch 64 is closed, $V_3+V_4$ must equal 0 and $Z_3+Z_4$ must equal 10 ohms. The characteristic impedance $Z_1$ is shown more clearly in the schematic diagram of FIG. 4. With resistor 58 equal to 14.8 and resistor 60 equal to 10 ohms, $Z_1$= 21.6 ohms.

When the switch 64 is open, $$V_3=0,\ Z_3=R_8,\ V_4=V_{in}\left(\frac{R_7}{R_6+R_7}\right)\text{ and }Z_4=\left(\frac{R_6R_7}{R_6+R_7}\right).$$

With the value of these components as given, the desired voltage $$V_2=\left(\frac{Z_1}{Z_1+6.84}\right)\left(\frac{1}{31.6}\right)V_{in}.$$

This in turn equals 0.0240 $V_{in}$. To generate this voltage $V_2$ when switch 64 is open $V_4$ must be approximately equal to $$\frac{10+Z_1/2}{Z_1/2}(V_2).$$

This in turn equals 0.0463 $V_{in}$. Therefore, the values of the branch resistors 52 and 54 and bypass resistor 80 in this example are as follows. Resistor 52 ($R_7$) equals 9.03 ohms. Resistor 54 ($R_8$) equals 1.39 ohms. Resistor 80 ($R_6$) equals 186 ohms. The resistor 80 can be a variable resistor which may be adjusted to produce no change in the output voltage $V_0$ when the switch 64 is actuated in response to movement of the output tap 68.

The circuit 90 of FIG. 5 shows a third alternative preferred embodiment of this invention. This circuit 90 employs a ladder network 92 identical to the ladder network 16 of the circuit shown in FIG. 1 with one exception. The exception is that the resistor 17 at node 42 in the circuit 10 is replaced by resistor 94 in branch B of FIG. 5. In other respects, resistor 96 are equal in value to resistor 20 of FIG. 1, resistors 98 are identical in value to resistors 15 of FIG. 1 and resistors 100 are equal in value to the resistors 17 of FIG. 1.

The switch 102 of circuit 90 is a single-pole single-throw switch operated by a cam 104 connected to the variable output tap 106 in the same fashion as has been described in respect to the switch 64 in FIG. 2. In circuit 90, the switch 102 is across the input terminals 108 of a differential amplifier 110. The output terminal 112 of the amplifier 110 is connected to bypass resistor 114 having a value $R_9$ which in turn is to the resistor 94 having a value $R_{10}$ in branch B at node 116.

The operation of the circuit 90 is as follows. When the variable output tap 106 is to the right of the switching point 118, the switch 102 is open circuited. Voltage is delivered from the source 120 to node 116 of the ladder network 92 through the bypass circuit 109 including amplifier 110 and bypass resistor 114. When the output tap 106, moving toward the left, passes the switching point 118, the switch 102 is closed. The closure of the switch 102 shunts the input 108 of the amplifier 110 and delivers voltage from input source 120 to its initial resistor 96 of the ladder network 92. With the input 108 of the amplifier 110 shunted, the output voltage $V_5$ of the amplifier 110 is 0 and branch B performs as a single passive resistor. When the switch 102 is opened in response to movement of the output tap 106 to the right of switching point 118, a voltage $V_5$ is produced at the output 112 of the amplifier 110. The gain of the amplifier 110 and the value of resistors 114 and 94 are selected to give the desired voltage $V_2$ at node 116.

For example, where the amplifier 110 has a gain of 1, the voltage $V_5$ at the output 112 $=V_{in}-V_1$, the net voltage across the input 108 of the amplifier 110. With the switch 102 open, $V_5=V_{in}$. To obtain the correct value of $V_2$ to prevent a change in the output voltage V at the output port 122 when switch 102 is actuated, it is required that $$V_5\left(\frac{R_{10}}{R_9+R_{10}}\right)=.0464\,V_{in}.$$

For the proper branch impedance of branch $$\frac{R_9R_{10}}{R_9+R_{10}}=10\text{ ohms},$$

the value of resistors 100. These conditions are met by resistor 114 ($R_9$)=216 ohms and resistor 94 ($R_{10}$)=10.6 ohms.

The circuit 129 shown in FIG. 6 employs a ladder network 130 identical to the ladder network 16 of FIG. 1 with the exception that resistor 132 having a value $R_{14}$ is substituted in branch B for the resistor 17 at node 42 in FIG. 1. A single-pole single-throw switch 134 is connected between an initial resistor 136 and the input terminal 138 of the ladder network 130. The ladder network 130 includes resistors 133 equal to resistors 17 in FIG. 1, and resistors 135 equal to resistors 15 in FIG. 1. The switch 134 is operated by a cam 140 in the same fashion as the circuits shown in FIGS. 1, 2 and 5. When the output tap 142 passes the switching point 144 moving toward the left, the cam 140 closes the terminals of switch 134. When the tap 142 moves towards the right past switching point 144, the cam allows the switch 134 to open.

In the circuit 129, a bypass amplifier circuit 146 is connected between the initial resistor 136 and the node 148 adjacent the resistor 132 of branch B. A feedback resistor 149 is connected between the output 150 of amplifier 152 and the input 154 of amplifier 152. A resistor 156 ($R_{11}$) is connected in series with input terminal 154 of the amplifier 152. A resistor 158 ($R_{13}$) is connected in series with the output 150 of the amplifier 152 to node 148 at branch B.

The ratio of resistor 149 ($R_{12}$) to resistor 156 ($R_{11}$) is selected to provide 0 voltage $V_6$ at the output 150 of the amplifier 152 when the switch 134 is closed. With the switch 134 closed, the branch B acts as a single passive resistor. Resistors 158 and 132 are selected to provide an effective impedance of 10 ohms when the switch 134 is closed.

When the switch 134 is open, a voltage $V_6$ is produced at the output 150 of the amplifier 152. The circuit 129 is designed to provide a voltage $V_2$ at node 148 with switch 134 closed, equal to the voltage $V_2$ at node 148 with the switch 134 open. The gain (A) of amplifier 152 and values of resistors 158 ($R_{13}$) and 132 ($R_{14}$) are selected to provide such a voltage.

The voltage $V_6$ at the output 150 equal the amplifier 152 is to $$\frac{A}{1+\left(\frac{AR_{11}}{R_{11}+R12}\right)}\left(V_7-\left[\frac{R_{12}}{R_{11}+R_{12}}\right]V_{in}\right),$$

where $V_7$ is the voltage at node 162, For large values of A, $V_6$ is approximately equal to $$\left(\frac{R_{11}+R_{12}}{R_{11}}\right)V_7-\left(\frac{R_{12}}{R_{11}}\right)V_{in}.$$

When the switch 134 is closed, $V_7$ equals $$\frac{Z_1}{6.84+Z1}=.759\ V_{in},$$

where $Z_1$ is the value of the characteristic impedance and 6.84 ohms is the value of resistors 160 and 136 respectively. $V_6$ therefore equals $$\left(.759-.241\frac{R_{12}}{R_{11}}\right)V_{in}$$

which we wish to set equal to 0 when switch 134 is closed. Thus, the ratio of resistor 149 ($R_{12}$) to resistor 156 ($R_{11}$) equals 3.16.

When the switch 134 is open, $V_7$ equals $V_{in}$ equals $V_6$. For the required value of $V_2$, $$V_6\left(\frac{R_{14}}{R_{13}+R_{14}}\right)=.0464\ V_{in}.$$

For the proper branch impedance, $$\frac{R_{13}R_{14}}{R_{13}+R_{14}}=10\text{ ohms},$$

the value of resistors 133. These boundary conditions are met by a resistor 158 ($R_{13}$) equal to 216 ohms and a resistor 132 ($R_{14}$) equal to 10.6 ohms.

The circuit shown in FIG. 1 functions effectively to extend the overall range of attenuation of the ladder network 16 while reducing the undesired coupling between the input and the output. Because of the time interval required to complete the transfer of the single-pole double-throw switch 34, a transient signal is generated. In the circuits of FIGS. 2, 5 and 6, this time interval is eliminated to prevent generation of the transient signal. While in the foregoing, the components of the various circuits have been described with examples of particular component values, it should be appreciated that the particular value of each components is not critical so long as the relationships between the components are maintained to achieve the overall purposes of this invention.

It should also be understood that the cam employed to switch the input tap of the various circuits described in FIGS. 1, 2, 5 and 6 is only one of the embodiments which may be employed to accomplish this function. Other techniques well known in the art may likewise be employed without departing from the scope of this invention.

It is to be understood that the present embodiments of this invention described above are merely illustrative of several applications of the principals of this invention. A variety of other arrangements well known in the art could similarly be employed to instrument this invention without departing from the true spirit and scope thereof.

What is claimed is:

1. In a continuously variable signal attenuator including an input port and an output port, a ladder network having a plurality of resistor sections connected in cascade to said input port and a variable tap connecting said output port to said resistor sections, an improvement comprising:
   - means for applying an input voltage from a voltage source to either said input port or to a bypass resistor connected to one of said resistor sections; and
   - means responsive to said variable tap for switching said voltage applying means between said input port and said bypass resistor as said variable tap passes a predetermined point along said cascaded resistor sections.

2. The improvement of claim 1 wherein said voltage applying means comprise a single-pole double-throw switch having a fixed contact connected to an input voltage source and na movable contact displaceable into connection with said input port or with said bypass resistor.

3. The improvement as set forth in claim 1 including a characteristic impedance resistor in parallel across the end of said ladder network.

4. In a continuously variable signal attenuator including an input port and an output port, a ladder network having a plurality of resistor sections having a common node connected in cascade to said input port and a variable tap connecting said output port to said resistor sections, an improvement comprising, in combination:
   - a first resistor and a second resistor in series with said first resistor, said series connected resistors connected as a branch of one of said resistor sections with said second resistor connected to the common node of said resistor sections;
   - a bypass resistor in series with an input voltage source, said series connected source and bypass resistor connected in parallel across said first resistor; and
   - switch means responsive to said tap for connecting or disconnecting said input source to said input port whenever said tap passes a predetermined point along said resistor sections.

5. The improvement of claim 4 wherein said switch means include a single-pole single-throw switch having a fixed contact connected through a series resistor to said source and a movable contact displaceable into connection with said input port.

6. The improvement as set forth in claim 4 including a characteristic impedance resistor in parallel across the end of said ladder network.

7. In a continuously variable signal attenuator including an input port and an output port, a ladder network having a plurality of resistor sections connected in cascade, said network connected at one end to said input port, and a variable tap connecting said output port to said resistor sections, an improvement comprising, in combination:

a branch resistor connected in series as a leg of one of said sections;

a single-pole single-throw switch having a fixed contact connected to a voltage source and a movable contact displaceable into connection with said input port;

means responsive to said tap for actuating said switch whenever said tap passes a predetermined point along said resistor sections; and bypass circuit means connected between said switch and said branch resistor for maintaining the voltage at said input port at a constant when said switch is actuated.

8. The improvement as set forth in claim 7 wherein said bypass circuit means comprise an amplifier having a pair of input leads connected across said switch and an output lead connected to a bypass resistor, said bypass resistor connected to said branch resistor.

9. The improvement as set forth in claim 7 wherein said bypass circuit means comprise an amplifier having a pair of input terminals and an output terminal, said input terminals connected across an initial resistor, said initial resistor connected between said fixed switch contact and said voltage source, a balance resistor in series with one of said amplifier input terminals, a feedback resistor connected between said amplifier output terminal and said one amplifier input terminal, and a bypass resistor connected between said amplifier output terminal and said branch resistor.

* * * * *